United States Patent [19]

Frimer

[11] E Patent Number: Re. 33,485

[45] Reissued Date of Patent: Dec. 11, 1990

[54] LIGHTED GUN SIGHTS

[75] Inventor: Itzchak Frimer, Bnai Brak, Israel

[73] Assignee: Scopus Optical Industry, Hof HaCarmel, Israel

[21] Appl. No.: 156,862

[22] Filed: Feb. 17, 1988

Related U.S. Patent Documents

Reissue of:

[64] Patent No.: 4,574,335
Issued: Mar. 4, 1986
Appl. No.: 650,552
Filed: Sep. 12, 1984

U.S. Applications:

[63] Continuation of Ser. No. 316,053, Oct. 28, 1981, abandoned.

[30] Foreign Application Priority Data

Oct. 31, 1980 [IL] Israel ..... 61388

[51] Int. Cl.[5] ..... F41G 1/34

[52] U.S. Cl. ..... 362/84; 362/110; 42/100; 42/103; 33/241; 33/254

[58] Field of Search ..... 362/84, 110, 109; 42/100, 103; 33/241, 243, 242, 254; 250/467.1, 458.1

[56] References Cited

U.S. PATENT DOCUMENTS

| | | | |
|---|---|---|---|
| 211,763 | 1/1879 | Matthews | 33/254 |
| 1,129,326 | 2/1915 | Atlee | 33/254 |
| 1,357,095 | 10/1920 | Kaempfer | 33/241 |
| 1,363,553 | 12/1920 | Barringer | 33/241 |
| 1,370,478 | 3/1921 | Paulson | 33/254 |
| 2,682,707 | 7/1954 | Dahlberg | 33/254 |
| 2,706,335 | 4/1955 | Munsey | 33/241 |
| 2,727,309 | 12/1955 | Jenkins | 42/100 |
| 2,817,904 | 12/1957 | Lee | 33/254 |
| 3,098,303 | 7/1963 | Plisk | 33/241 |
| 3,500,545 | 11/1967 | Chivers | 33/241 |
| 3,641,676 | 2/1972 | Knutsen et al. | 33/241 |
| 3,698,092 | 10/1972 | Rosenhan | 33/241 |
| 3,914,873 | 10/1975 | Elliott, Jr. et al. | 42/1 A X |
| 3,916,530 | 5/1974 | Tellie | 33/241 |
| 4,070,763 | 1/1978 | Carts, Jr. | 362/110 X |
| 4,208,821 | 6/1980 | Power | 42/1 S |
| 4,574,335 | 3/1986 | Frinier | 362/84 |

FOREIGN PATENT DOCUMENTS

| | | | |
|---|---|---|---|
| 79147 | 11/1919 | Australia | 33/52 |
| 575927 | 5/1959 | Canada | 33/254 |
| 2063347 | 7/1972 | Fed. Rep. of Germany . | |
| 2426368 | 6/1973 | Fed. Rep. of Germany . | |
| 29040 | 11/1967 | Israel . | |
| 31985 | 4/1969 | Israel . | |
| 15769 | of 1906 | United Kingdom | 33/254 |
| 952372 | 3/1964 | United Kingdom | 33/254 |

*Primary Examiner*—Ira S. Lazarus
*Assistant Examiner*—D. M. Cox
*Attorney, Agent, or Firm*—Browdy and Neimark

[57] ABSTRACT

Apparatus for assisting aiming of firearms in darkness comprising a sight defining two spaced upstanding elements, each bearing at identical levels thereon one of a pair of light sources defining dots; a forward pointer comprising a base portion whose height is determined by rotatable threading thereof into a socket fixed on the firearm, and a top portion which is rotatably mounted with respect to the base portion for rotation about the longitudinal axis of the pointer; and a third light source defining a dot associated with the top portion of the forward pointer of the firearm, the third light source arranged to be aligned along a line between the pair of light sources and aligned with a target when the firearm is aimed in darkness.

8 Claims, 1 Drawing Sheet

LIGHTED GUN SIGHTS

Matter enclosed in heavy brackets [ ] appears in the original patent but forms no part of this reissue specification; matter printed in italics indicates the additions made by reissue.

This application is a *reissue of application Ser. No. 06/650,552 filed Sept. 12, 1984 now U.S. Pat. No. 4,574,335, which is a* continuation of application Ser. No. 316,053, filed Oct. 28, 1981, now abandoned.

FIELD OF THE INVENTION

The present invention relates to firearms generally and more particularly to aiming devices for firearms.

BACKGROUND OF THE INVENTION

Various aiming devices are known for firearms. For example in the well-known M-16 rifle, the aiming apparatus comprises a an apertured sight which is mounted generally above the trigger portion of the rifle and a forward pointer mounted over the barrel. Aiming of the gun is accomplished by visually lining up the pointer on the target in the sight. The forward pointer may be selectably raised and lowered for adjustment of the aim of the rifle.

In darkness the forward pointer cannot normally be seen and it is therefore conventional to ignore the pointer and attempt to line up the pointer housing with the target. This technique leads to greatly decreased accuracy in firing.

SUMMARY OF THE INVENTION

The present invention seeks to overcome the disadvantages of conventional aiming apparatus in night firing and to provide apparatus which greatly enhances the accuracy of night firing.

There is thus provided in accordance with an embodiment of the present invention apparatus for assisting aiming of firearms in darkness comprising a light source associated with a firearm and arranged to be lined up with a target when the firearm is aimed in darkness.

According to a preferred embodiment of the invention, the light source is associated with the forward pointer. Alternatively, the light source may be associated with another member including, for example, the sight. As a further alterative a plurality of light sources may be provided for being lined up with each other when aiming.

Further in accordance with a preferred embodiment of the invention, the light source comprises luminescent or radioactive material which is deposited on a surface of the forward pointer.

Care is normally to be taken so as to prevent the light source from being visible forward of the rifle, so as to prevent detection thereof by an enemy.

According to one embodiment of the invention, the gun sight may also be coated with luminescent material, preferably producing visible radiation of a different wavelength. For example, the gun sight may define a pair of spaced dots and the forward pointer may define a dot of a different color which is to be lined up in the center of a circle defined between the two dots.

Additionally in accordance with a preferred embodiment of the invention the forward pointer comprises a base portion whose height relative to the firearm is determined by rotatably threading thereof into a socket fixed on the firearm, and a top portion which is rotatably mounted with respect to the base and which has formed thereon a deposit of luminescent or radioactive material.

BRIEF DESCRIPTION OF THE DRAWINGS

The invention will be understood more fully and appreciated from the following detailed description taken in conjunction with the drawing in which.

DETAILED DESCRIPTION OF THE INVENTION

Figure 1:
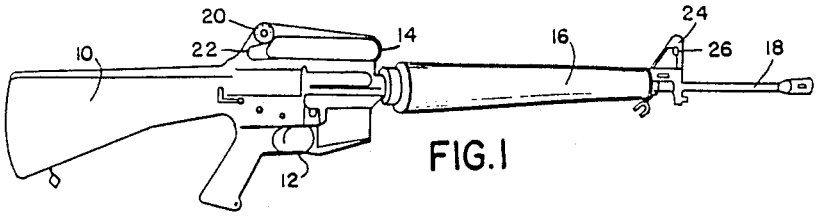
FIG. 1 is a side view illustration of an M-16 rifle.

Referring now to FIG. 1 there is seen an M-16 rifle of conventional construction, comprising a stock 10, trigger portion 12, carrying handle 14, insulated barrel housing 16 and forward barrel portion 18. An aiming sight 20 is mounted on sight mounting apparatus 22 on the carrying handle and a forward pointer 24 is mounted on pointer mounting apparatus 26 on the forward barrel portion 18.

Figure 2:
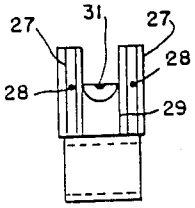
FIG. 2 is an illustration of the rear aiming apparatus constructed and operative in accordance with an embodiment of the present invention.

The aiming sight of the present invention is illustrated in FIG. 2 and comprises a pair of upstanding rod elements 27 having formed at identical levels thereon a pair of dots of radiation producing material such as a luminescent material, indicated by reference numerals 28. Disposed intermediate the rod elements 27 is a plate member 29 defining a half circular recess 31 which is disposed precisely intermediate dots 28. It is noted that the rod elements and the plate member may be mounted on an entirely conventional aiming sight mounting.

Figure 3A:
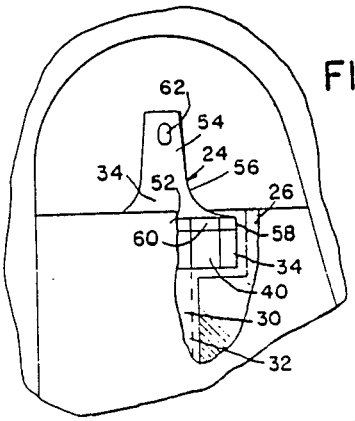
FIGS. 3A and 3B are respective rear and sectional illustrations of forward pointer apparatus constructed and operative in accordance with an embodiment of the present invention.
Figure 3B:
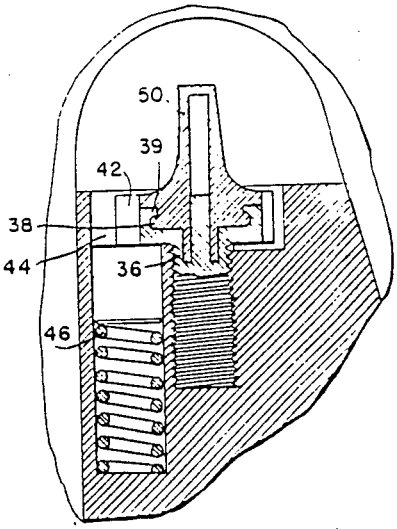

The forward pointer constructed and operative in accordance with the present invention is illustrated in rear view illustration in FIG. 3A and in sectional illustration in FIG. 3B and comprises a base member 30 including a threaded cylindrical bottom portion 32 which is screwed into a socket 31 formed in mounting apparatus 26 at a selectable height and a top portion 34 including an interior recess having a relatively narrow cylindrical bottom portion 36, a broadened intermediate portion 38 and a slightly narrowed top retaining portion 39. The peripheral outer surface of top portion 34 is formed with a plurality of vertically extending recesses 40, for restraining rotation of the pointer in a conventional manner as will be described hereinafter.

Since the rotation of the forward pointer base member 30 determines the overall height of the pointer, it is desirable to prevent unintended rotation of the base member 30 in the socket formed in mounting apparatus 26. This is accomplished in a conventional manner by the provision of a pin 42 arranged adjacent the base portion 30 in a socket 44 formed in the mounting apparatus 26. The pin 42 is biased upwardly by a spring 46 so as to engage recesses 40, thereby preventing rotation thereof. Rotation of base member 30 with respect to the mounting apparatus 26 may be accomplished by first depressing pin 42 below the level of top portion 34 of the base member 30.

Arranged in snap fit rotatable engagement with base member 30 is a top member 50 including a bottom portion 52 which fits into the interior recess of the base member 30 and a top portion 54 having a tapered top surface 56 and a peripheral edge surface 58 formed with recesses 60 corresponding to recesses 40. Arranged along one side of the top surface is a deposit of radioactive or other luminescent material 62 which is visible in the darkness.

In use, the height of the pointer is set by suitably rotating base member 30 in its socket an then the top member 50 is rotated with respect thereto such that the radioactive material faces rearwardly. Pin 42 serves to prevent undesired relative rotation of the top and bottom members and of the base member 30 relative to the mounting apparatus 26.

Figure 5:
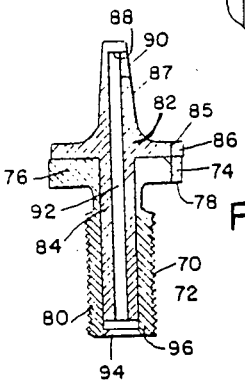
FIG. 5 is a sectional illustration of the embodiment of FIG. 4.
Figure 4:
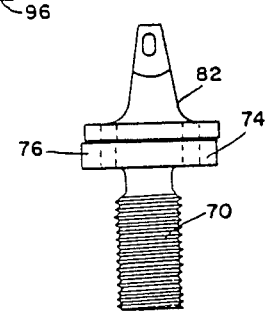
FIG. 4 is a side view illustration of another embodiment of a forward pointer.

Reference is now made to FIGS. 4 and 5 which illustrate a forward pointer constructed and operative in accordance with an alternative embodiment of the present invention. The pointer comprises a base member 70 having a threaded lower cylindrical surface 72 and an upper cylindrical portion 74 having a generally cylindrical peripheral surface 76 in which are formed a plurality of semicircular recesses 78 which correspond to recesses 40 (FIGS. 3A and 3B in its structure and function). A longitudinal bore 80 is formed in base member 70. A top member 82 is formed with a shaft portion 84 which is inserted into bore 80 for rotatable engagement therewith and a cylindrical portion 85. Having recesses 86 in its generally cylindrical peripheral surface. Recesses 86 correspond to recesses 60 (FIGS. 3A and 3B). Cylindrical portion 85 tapers upwardly to a flat top portion 87. A bore 88 is formed longitudinally of top member 82. Adjacent the top of top portion 87 at one side thereof there is formed an aperture 90 which permits communication between the interior of the bore 88 and the outside of the top portion 87.

Disposed in bore 88 is a shaft 92 which is formed with a radiation source material which produces sensible raidation, preferably in the visible spectrum. The light produced by the material on shaft 92 is visible through aperture 90 at one side of the top member.

Shaft 92 is retained in top member 82 in a press fit arrangement and permits relative rotation between the base and the top member 82. Shaft 92 is broadened at its bottom portion 94. The bottom portion engages a corresponding counter sink 96 the base for holding the base and the top member in rotatable joined engagement.

It is noted that the apparatus of the present invention may be formed of any suitable material, such as metal or plastic. The embodiment illustrated in FIGS. 3A and 3B is designed to be manufactured of plastic, while the embodiment of FIGS. 4 and 5 is designed to be manufactured of metal.

It will be appreciated by persons skilled in the art that any suitable light source may be employed in accordance with the invention. Where both the sight and the forward pointer have light sources, light sources of different wavelength may be used for ease in differentiating therebetween. The aiming mechanism is not limited to use with small arms and may be employed in any application where it is suitable.

The invention is not limited by what has been particularly shown and described herein. Rather the scope of the present invention is defined only the claims which follow:

I claim:

1. Apparatus for assisting aiming of firearms in darkness comprising:

[a sight defining two spaced upstanding elements, each bearing at identical levels thereon one of a pair of light sources defining dots;]

a [forward] pointer having a longitudinal axis, said pointer comprising a base portion whose height is determined by rotatable threading thereof into a socket fixed on the firearm, and a top portion which is rotatably mounted with respect to said base portion and arranged for rotation about a rotation axis defined by the longitudinal axis of said [forward] pointer without changing the height thereof; and a [third] light source defining a dot associated with the top portion of said [forward] pointer of said firearm, [said third light source arranged to be aligned along a line between said pair of light sources and aligned with a target when the firearm is aimed in darkness,] whereby said [third] light source may be maintained in a rearward facing direction with respect to the firearm at any height [thereof] *of the light source.*

2. Apparatus according to claim 1 and wherein [at least one of] said light [sources] *source* comprises luminescent material.

3. Apparatus according to claim 1 and being formed of a plastic material.

4. Apparatus according to claim 1 and being formed of metal.

5. Apparatus according to claim 8 and wherein said sight further comprises a plate member disposed between said upstanding elements and defining a recess disposed along a line with the pair of light sources disposed on two upstanding elements.

6. Apparatus according to claim 8 and wherein each of said pair of light sources defines an imaginary illuminated circle of a first color on said sight.

7. Apparatus according to claim 6 and wherein said [third] light source [comprises] *on said pointer comprises* a light source of a second color associated with said forward pointer of the firearm.

*8. Apparatus according to claim 1 and also comprising a sight defining two spaced upstanding elements, each bearing at identical levels thereon one of a pair of light sources defining dots and wherein said light source on said pointer is arranged to be aligned along a line between said pair of light sources and aligned with a target when a firearm is aimed in darkness.*

* * * * *